US012218559B2

(12) United States Patent
Shimogai et al.

(10) Patent No.: US 12,218,559 B2
(45) Date of Patent: Feb. 4, 2025

(54) DRIVE APPARATUS

(71) Applicant: NIDEC CORPORATION, Kyoto (JP)

(72) Inventors: Daiki Shimogai, Kyoto (JP); Takashi Shiraishi, Kyoto (JP); Takaya Tamaki, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 233 days.

(21) Appl. No.: 17/939,958

(22) Filed: Sep. 8, 2022

(65) Prior Publication Data
US 2023/0085414 A1 Mar. 16, 2023

(30) Foreign Application Priority Data

Sep. 10, 2021 (JP) .................................. 2021-147773

(51) Int. Cl.
| | |
|---|---|
| *H02K 5/20* | (2006.01) |
| *B23Q 11/12* | (2006.01) |
| *F16C 33/66* | (2006.01) |
| *H02K 5/14* | (2006.01) |
| *H02K 5/173* | (2006.01) |
| *H02K 7/06* | (2006.01) |

(Continued)

(52) U.S. Cl.
CPC ............. *H02K 5/203* (2021.01); *H02K 5/145* (2013.01); *H02K 7/083* (2013.01); *H02K 7/116* (2013.01); *H02K 9/193* (2013.01)

(58) Field of Classification Search
CPC .......... H02K 7/08; H02K 5/173; H02K 5/203; H02K 9/193; H02K 11/40; F16C 33/66; F16C 33/6637; F16C 33/664; F16C 33/6659; F16C 2380/26; F16C 35/077; B23Q 11/123

USPC ............................................. 384/606; 361/23
See application file for complete search history.

(56) References Cited

U.S. PATENT DOCUMENTS 5,322,373 A * 6/1994 Oakes ................... F16C 33/726
384/462
6,030,128 A * 2/2000 Pontzer ................ H02K 5/1732
384/536

(Continued)

FOREIGN PATENT DOCUMENTS

| JP | S5352903 A | | 5/1978 | |
|---|---|---|---|---|
| JP | 2000244180 | * | 9/2000 | ............... H05K 9/00 |

(Continued)

*Primary Examiner* — Burton S Mullins
(74) *Attorney, Agent, or Firm* — HAUPTMAN HAM, LLP

(57) ABSTRACT

A drive apparatus includes: a motor having a shaft; a bearing rotatably supporting the shaft; a housing for the motor and holding the bearing in a bearing holding portion; an insulating member between the bearing and the bearing holding portion; and an oil passage. The bearing holding portion includes a holding tubular portion holding the bearing from radially outside, and a holding bottom portion extending radially inward from an end on one side in the axial direction of the holding tubular portion. The insulating member includes an insulating tubular portion extending in the axial direction along the holding tubular portion, and an insulating bottom portion extending in the radial direction along the holding bottom portion. The holding tubular portion has a penetrating portion penetrating radially inside and outside. The oil passage includes a first channel inside the penetrating portion and a second channel connecting the first channel and the bearing.

18 Claims, 13 Drawing Sheets

(51) Int. Cl.
*H02K 7/08* (2006.01)
*H02K 7/116* (2006.01)
*H02K 9/193* (2006.01)

(56) References Cited

U.S. PATENT DOCUMENTS

| | | | |
|---|---|---|---|
| 7,594,757 B2 * | 9/2009 | Verhaegen | H02K 9/19 |
| | | | 384/313 |
| 10,240,617 B2 * | 3/2019 | Russalian | F04D 29/049 |
| 10,247,242 B2 * | 4/2019 | Piispanen | F16C 33/6607 |

FOREIGN PATENT DOCUMENTS

| | | | |
|---|---|---|---|
| JP | 2012255564 A | 12/2012 | |
| JP | 2021125895 A | 8/2021 | |
| JP | 2021125896 A | 8/2021 | |

* cited by examiner

DRIVE APPARATUS

CROSS-REFERENCE TO RELATED APPLICATIONS

The present invention claims priority under 35 U.S.C. § 119 to Japanese Patent Application No. 2021-147773 filed on Sep. 10, 2021, the entire content of which is incorporated herein by reference.

FIELD OF THE INVENTION

The present invention relates to a drive apparatus.

BACKGROUND

In recent years, with the spread of electric vehicles and hybrid vehicles, the development of drive apparatuses for driving vehicles has been advanced. In such a drive apparatus, oil may be stored therein in order to improve lubricity of the bearing. On the other hand, in the motor of the drive apparatus, a potential difference based on high-frequency induction is generated between the rotor and the stator. In the bearing that rotatably supports the rotor, there is a possibility that electrolytic corrosion caused by this potential difference occurs. A configuration using an insulating sleeve holding a bearing as a measure against electrolytic corrosion is conventionally described.

When the bearing is held by the insulating member from radially outside, there is a problem that it is difficult to secure a channel for supplying oil for enhancing lubricity of the bearing from the radially outer side of the bearing.

SUMMARY

One aspect of an exemplary drive apparatus of the present invention includes: a motor having a motor shaft that rotates about a motor axis; a bearing that rotatably supports the motor shaft; a housing that accommodates the motor therein and holds the bearing in a bearing holding portion; an insulating member interposed between the bearing and the bearing holding portion; oil contained in an inside of the housing; and an oil passage through which the oil flows. The bearing holding portion includes a holding tubular portion that holds the bearing from radially outside, and a holding bottom portion extending radially inward from an end portion on one side in the axial direction of the holding tubular portion. The insulating member includes an insulating tubular portion extending in the axial direction along the holding tubular portion, and an insulating bottom portion located at an end portion on one side in the axial direction of the holding bottom portion and extending in the radial direction along the holding bottom portion. The holding tubular portion is provided with the penetrating portion penetrating radially inside and outside. The oil passage includes a first channel disposed in the inside of the penetrating portion and a second channel connecting the first channel and the bearing.

The above and other elements, features, steps, characteristics and advantages of the present disclosure will become more apparent from the following detailed description of the preferred embodiments with reference to the attached drawings.

DETAILED DESCRIPTION

Figure 1:
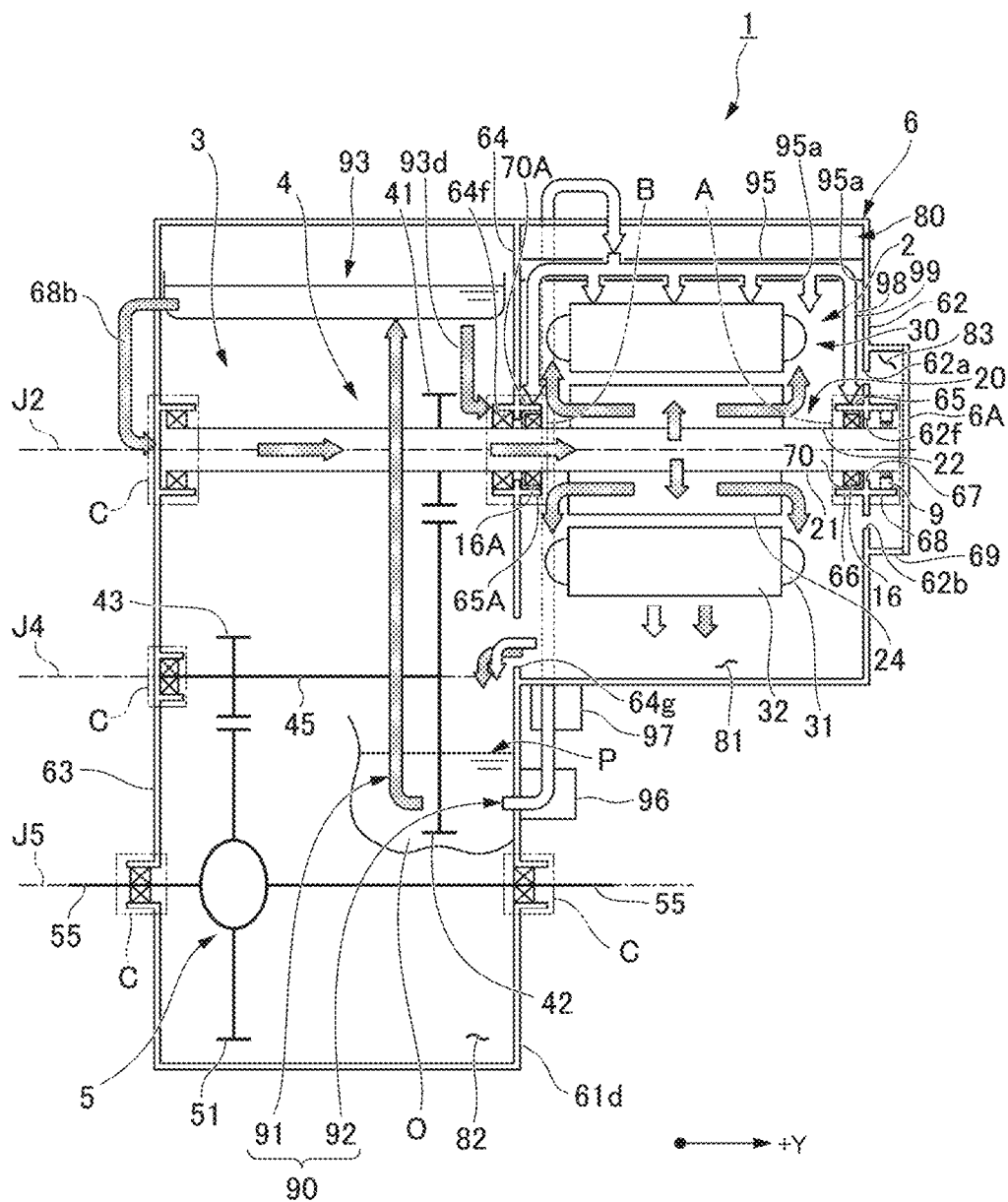
FIG. 1 is a conceptual view of a drive apparatus of an embodiment.

Hereinafter, motors according to embodiments of the present invention will be described with reference to the accompanying drawings.

The description below will be made with the direction of gravity being specified based on a positional relationship in a case where the drive apparatus 1 is mounted in a vehicle located on a horizontal road surface. In the drawings, the Y axis is appropriately illustrated. The Y-axis direction indicates a width direction (left-right direction) of the vehicle.

In the following description, unless otherwise specified, a direction (Y-axis direction) parallel to a motor axis J2 of a motor 2 may be simply referred to as an "axial direction". In addition, the vehicle left side (that is, +Y side) may be simply referred to as one side in the axial direction, and the vehicle right side (that is, −Y side) may be simply referred to as the other side in the axial direction. Further, the radial direction around the motor axis J2 may be simply referred to as "radial direction", and the circumferential direction around the motor axis J2, that is, the axis of the motor axis J2 may be simply referred to as "circumferential direction".

FIG. 1 is a conceptual diagram of a drive apparatus 1 according to an embodiment.

The drive apparatus 1 drives a vehicle. The drive apparatus 1 is mounted on a vehicle using a motor as a power source, such as a hybrid vehicle (HEV), a plug-in hybrid vehicle (PHV), or an electric vehicle (EV), and is used as the power source.

The drive apparatus 1 includes the motor 2, a power transmission mechanism 3, a housing 6, oil O, a pump 96, a cooler 97, an oil passage 90 through which the oil O flows, a supply pipe (oil supply portion) 95, a plurality of bearings 16 and 16A, insulating members 70 and 70A, and an electrical discharging device 9. An accommodation space 80 defined by a motor chamber 81 housing the motor 2 and a gear chamber 82 housing the power transmission mechanism 3 is provided in the inside of the housing 6.

The motor 2 is housed in the motor chamber 81 of the housing 6. The motor 2 includes a rotor 20 and a stator 30 located radially outside the rotor 20. The motor 2 is an inner rotor motor including the stator 30 and the rotor 20 disposed inside the stator 30 in a rotatable manner.

The rotor 20 is caused to rotate by power being supplied from a battery (not illustrated) to the stator 30. The rotor 20 includes a motor shaft 21, a rotor core 24, and a rotor magnet (not illustrated). That is, the motor 2 includes the motor shaft 21, the rotor core 24, and the rotor magnet. The rotor 20 rotates about the motor axis J2. The torque of the rotor 20 is transmitted to the power transmission mechanism 3.

The motor shaft 21 extends about the motor axis J2. The motor shaft 21 rotates about the motor axis J2. The motor shaft 21 is a hollow shaft in which a hollow portion 22 having an inner peripheral face extending along the motor axis J2 is provided.

The motor shaft 21 extends across the motor chamber 81 and the gear chamber 82 of the housing 6. One end portion of the motor shaft 21 protrudes toward the gear chamber 82. A pinion gear 41 is fixed to the end portion of the motor shaft 21 protruding to the gear chamber 82.

The motor shaft 21 is rotatably supported by the bearings 16 and 16A in the motor chamber 81. That is, the bearings 16 and 16A rotatably support the motor shaft 21. The bearing 16A supports the motor shaft 21 in the middle of the motor shaft 21. On the other hand, the bearing 16 supports the end portion on one side (+Y side) in the axial direction of the motor shaft 21.

The rotor core 24 is defined by laminated silicon steel sheets. The rotor core 24 is a columnar body extending along the axial direction. A plurality of rotor magnets not illustrated are fixed to the rotor core 24. The plurality of rotor magnets are aligned along the circumferential direction with magnetic poles arranged alternately.

The stator 30 encloses the rotor 20 from radially outside. The stator 30 has a stator core 32, a coil 31, and an insulator (not illustrated) interposed between the stator core 32 and the coil 31. The stator 30 is held by the housing 6. The stator core 32 has a plurality of magnetic pole teeth (not illustrated) extending radially inward from the inner peripheral face of an annular yoke. A coil wire is wound between the magnetic pole teeth. The coil wire wound around the magnetic pole teeth constitutes the coil 31.

The power transmission mechanism 3 is housed in the gear chamber 82. The power transmission mechanism 3 is connected to the motor shaft 21. The power transmission mechanism 3 includes a plurality of transmission shafts (intermediate shaft 45 and output shaft 55) and a plurality of gears (pinion gear 41, counter gear 42, drive gear 43, and ring gear 51) provided on an outer peripheral face of the transmission shaft. The power transmission mechanism 3 transmits power of the motor 2 by the plurality of gears.

The power transmission mechanism 3 includes a reduction gear 4 and a differential device 5. The reduction gear 4 has a function of increasing the torque output from the motor 2 in accordance with a reduction ratio by reducing rotation speed of the motor 2. The reduction gear 4 is connected to the motor shaft 21 of the motor 2. The reduction gear 4 transmits the torque outputted from the motor 2 to the differential device 5. The differential device 5 is a device arranged to transfer the torque outputted from the motor 2 to wheels of the vehicle. The differential device 5 has a function of transferring the torque to the pair of output shaft 55 while absorbing a difference in speed between the left and right wheels when the vehicle is turning.

The reduction gear 4 includes a pinion gear 41, an intermediate shaft 45, and a counter gear 42 and a drive gear 43 fixed to the intermediate shaft 45. The torque output from the motor 2 is transmitted to the ring gear 51 of the differential device 5 via the motor shaft 21, the pinion gear 41, the counter gear 42, and the drive gear 43 of the motor 2. The number of gears, the gear ratios of the gears, and so on can be modified in various manners in accordance with a desired reduction ratio. The reduction gear 4 is a reduction gear of a parallel-axis gearing type, in which center axes of gears are arranged in parallel with each other.

The pinion gear 41 is fixed to the outer peripheral face of the motor shaft 21 of the motor 2. The pinion gear 41 rotates about the motor axis J2 together with the motor shaft 21.

The intermediate shaft 45 extends along an intermediate axis J4 parallel to the motor axis J2. The intermediate shaft 45 rotates about the intermediate axis J4. The intermediate shaft 45 is rotatably supported on the inner side face of the housing 6 via a bearing.

The counter gear 42 and the drive gear 43 are arranged side by side in the axial direction. The counter gear 42 and the drive gear 43 are provided on the outer peripheral face of the intermediate shaft 45. The counter gear 42 and the drive gear 43 are connected via the intermediate shaft 45. The counter gear 42 and the drive gear 43 rotate about the intermediate axis J4. At least two of the counter gear 42, the drive gear 43, and the intermediate shaft 45 may be formed of a single member. The counter gear 42 meshes with the pinion gear 41. The drive gear 43 meshes with the ring gear 51 of the differential device 5.

The differential device 5 includes the ring gear 51 and a pair of output shafts 55. The ring gear 51 rotates about a differential axis J5 parallel to the motor axis J2. The torque outputted from the motor 2 is transferred to the ring gear 51 through the reduction gear 4. The pair of output shafts 55 extends along the axial direction. A side gear is connected to one end of each of the pair of output shafts 55, and a wheel is connected to the other end. The pair of output shafts 55 transmits the torque of the motor 2 to the road surface via the wheels.

The housing 6 accommodates the motor 2 and the power transmission mechanism 3 therein. The housing 6 has a first wall portion (wall portion) 62 and a second wall portion 64 extending along a plane orthogonal to the axial direction. The first wall portion 62 is disposed on one side (+Y side) in the axial direction of the motor 2. The second wall portion 64 is disposed on the other side (−Y side) in the axial direction of the motor 2. The second wall portion 64 is disposed between the motor 2 and the power transmission mechanism 3. A part of the second wall portion 64 partitions the accommodation space 80 in the housing 6 into the motor chamber 81 and the gear chamber 82.

The first wall portion 62 is provided with a first shaft passing hole 62f, a first opening portion 62a, a second opening portion 62b, a bearing holding portion 65, an electrical discharging device holding portion 68, and a cover fixing portion 69. The electrical discharging device holding portion 68 holds the electrical discharging device 9. The bearing holding portion 65 holds the bearing 16. The insulating member 70 is interposed between the bearing 16 and the bearing holding portion 65.

A cover 6A is fixed to the first wall portion 62. The cover 6A is fixed to the cover fixing portion 69. A sensor chamber 83 is provided between the first wall portion 62 and the cover 6A. The cover 6A covers the first shaft passing hole 62f, the first opening portion 62a, and the second opening portion 62b of the first wall portion 62 from one side (+Y side) in the axial direction.

Figure 2:
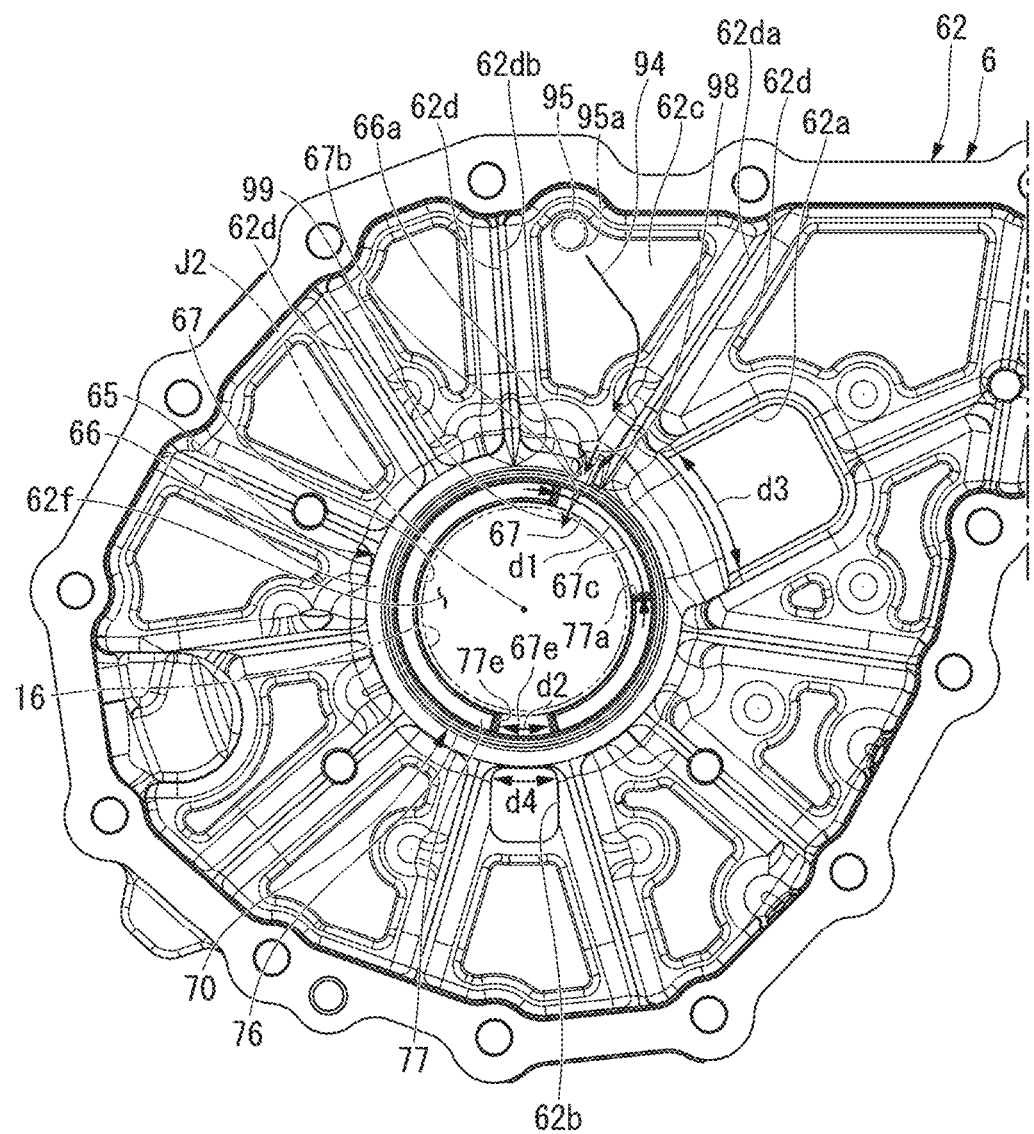
FIG. 2 is a plan view of a first wall portion according to an embodiment.

FIG. 2 is a plan view of the first wall portion 62 as viewed from the motor chamber 81 side.

The first shaft passing hole 62*f*, the first opening portion 62*a*, and the second opening portion 62*b* pass through the first wall portion 62 in the axial direction. An end portion on one side in the axial direction of the motor shaft 21 passes through the first shaft passing hole 62*f*. The first opening portion 62*a* is provided to dispose, for example, a rotation sensor (not illustrated) that measures the rotation speed of the motor shaft 21, a harness (not illustrated) of the rotation sensor, and the like. The second opening portion 62*b* is disposed below the first shaft passing hole 62*f* and the first opening portion 62*a*. The second opening portion 62*b* of the present embodiment is disposed immediately below the motor axis J2. The second opening portion 62*b* is provided to return the oil O that has entered the sensor chamber 83 from the first shaft passing hole 62*f* or the first opening portion 62*a* into the motor chamber 81.

As illustrated in FIG. 1, the second wall portion 64 is provided with a second shaft passing hole 64*f*, a third opening portion 64*g*, and a bearing holding portion 65A. The bearing holding portion 65A holds the bearing 16A. An insulating member 70A is interposed between the bearing 16A and the bearing holding portion 65A.

The second shaft passing hole 64*f* and the third opening portion 64*g* pass through the second wall portion 64 in the axial direction. The motor shaft 21 passes through the second shaft passing hole 64*f*. The third opening portion 64*g* is provided near the bottom portion of the motor chamber 81. The oil O that has cooled the motor 2 in the motor chamber 81 moves from the motor chamber 81 to an oil pool P in the gear chamber 82 via the third opening portion 64*g*.

The bearing holding portion 65 of the first wall portion 62 and the bearing holding portion 65A of the second wall portion 64 are both disposed on the motor axis J2. The housing 6 holds the bearing 16A in the bearing holding portion 65A and holds the bearing 16 in the bearing holding portion 65. Note that specific configurations of the bearing holding portions 65 and 65A will be described in detail later.

A catch tank 93 is disposed in the gear chamber 82 of the housing 6. The catch tank 93 opens upward. The catch tank 93 functions as a reservoir for temporarily storing oil. The oil O scraped up by the counter gear 42 is accumulated in the catch tank 93.

The electrical discharging device 9 is held by the electrical discharging device holding portion 68 of the housing 6. The electrical discharging device 9 has an annular shape surrounding the motor shaft 21. In the present embodiment, the electrical discharging device 9 has an annular shape centered on the motor axis J2. The electrical discharging device 9 surrounds the end portion on one side (+Y side) in the axial direction of the motor shaft 21 from radially outside.

The electrical discharging device 9 includes an annular base portion centered on the motor axis J2 and a brush portion provided over the entire circumference at a radially inner edge portion of the base portion. The electrical discharging device 9 is fixed to the electrical discharging device holding portion 68 at the base portion. Therefore, the electrical discharging device 9 is in electrical contact with the housing 6 at the base portion. The electrical discharging device 9 comes into contact with the outer peripheral face of the motor shaft 21 at the brush portion. That is, the electrical discharging device 9 electrically contacts the rotor 20 in the brush portion.

In the present specification, the text, "an object is in electrical contact with another object", means that an electric current can flow between the object and the other object.

According to the present embodiment, the motor shaft 21 and the housing 6 are electrically connected via the electrical discharging device 9. Therefore, the current generated in the motor shaft 21 can flow in the housing 6. As a result, it is possible to suppress the current from flowing through each bearing electrically connected to the motor shaft 21 and to suppress the occurrence of electrolytic corrosion in the bearing.

In the electrical discharging device 9 of the present embodiment, the case where the current flows directly from the motor shaft 21 to the housing 6 has been described. However, it is possible to obtain an effect as long as the electrical discharging device 9 is provided in a portion electrically connected to the motor shaft 21. That is, the electrical discharging device 9 may be provided on any one of the motor shaft 21 and the plurality of transmission shafts (intermediate shaft 45 and output shaft 55). In this case, the electrical discharging device 9 electrically connects the shaft and the housing 6 to release the charges of the shaft to the housing 6.

The relationship between the insulating member 70 and the electrical discharging device 9 in the drive apparatus 1 will be described more specifically. In a general motor, a high-frequency circulating current is generated in a motor shaft, one bearing, a housing, the other bearing, and a closed circuit connecting the motor shaft. Here, one bearing is a bearing on a side that transmits power and corresponds to the bearing 16A of the present embodiment, and the other bearing corresponds to the bearing 16.

In the present embodiment, the insulating members 70 and 70A are attached to the bearings 16 and 16A, respectively. As a result, the closed circuit is cut off, and the generation of the circulating current is cut off. According to the present embodiment, by further providing the electrical discharging device 9 for static elimination, it is possible to suppress the potential difference generated in the closed circuit and to suppress the occurrence of electrolytic corrosion in the bearings 16 and 16A.

Note that a preferable position to which the electrical discharging device 9 is attached also changes according to the position of the bearing to which the insulating members 70 and 70A are attached. In FIG. 1, positions where the insulating members 70 and 70A or the electrical discharging device 9 can be disposed are a position A, a position B, and a position C, respectively. The position A is a supporting position of the motor shaft 21 on one side (+Y side) in the axial direction of the motor 2. The position B is a supporting position of the motor shaft 21 on the other side (−Y side) in the axial direction of the motor 2. The position C is a supporting position of the transmission shaft (motor shaft 21, intermediate shaft 45, and output shaft 55) in the gear chamber 82. Although not illustrated in FIG. 1, the position C also includes a portion that supports one side (+Y side) in the axial direction the intermediate shaft 45.

When the insulating member 70 is attached only to the position A, the current flowing through the motor shaft 21 is induced to the position B, so that the electrical discharging device 9 is preferably attached to the position B.

When the insulating member 70 is attached only to the position B, the current flowing through the motor shaft 21 is induced to the position A, so that the electrical discharging device 9 is preferably attached to the position A.

When the insulating member 70 is attached to the positions A and B, the current flowing through the motor shaft 21 is guided to the gear chamber 82 side, so that the electrical discharging device 9 is preferably attached to any position C.

The oil O is contained in the inside of the housing. The oil O is used to lubricate the reduction gear 4 and the differential device 5. In addition, the oil O is used for cooling the motor 2. The oil O accumulates in the lower region (that is, the oil pool P) in the gear chamber 82. An oil equivalent to a lubricating oil (ATF: Automatic Transmission Fluid) for an automatic transmission having a low viscosity is preferably used as the oil O so that the oil O can perform functions of a lubricating oil and a cooling oil.

As illustrated in FIG. 1, the oil O circulates in the oil passage 90 in the drive apparatus 1. The oil passage 90 is a channel of the oil O for supplying the oil O from the oil pool P to the motor 2.

Note that, in the present specification, the term "oil passage" refers to a channel along with the oil O circulates in the accommodation space 80. Therefore, the "oil passage" is a concept including not only a "flow passage" that constantly forms a steady oil flow in one direction, but also a flow passage for temporarily retaining the oil (for example, a flow passage that functions as a reservoir such as a catch tank) and a flow passage through which the oil drips.

The oil passage 90 is arranged to extend over both the motor chamber 81 and the gear chamber 82 of the accommodation space 80. The oil passage 90 is a channel of the oil O that guides the oil O from the oil pool P to the oil pool P again via the motor 2. The oil passage 90 includes a first oil passage 91 and a second oil passage 92.

Each of the first oil passage 91 and the second oil passage 92 is a channel along which the oil O is fed from the oil pool P to the motor 2 and back into the oil pool P. In each of the first oil passage 91 and the second oil passage 92, the oil O drips from the motor 2 and accumulates in the lower region in the motor chamber 81. The oil O accumulated in the lower region in the motor chamber 81 moves to the lower region (that is, the oil pool P) in the gear chamber 82 via the third opening portion 64*g*.

In the first oil passage 91, the oil O is scraped up from the oil pool P by the counter gear 42 and guided to the catch tank 93. Part of the oil O scraped up by the counter gear 42 is guided to the bearing to improve the lubricity of the bearing. The other part of the oil O scraped up by the counter gear 42 falls down from above on each gear in the gear chamber 82 and is supplied to the tooth surface of each gear.

Part of the oil O accumulated in the catch tank 93 passes through a first oil introduction path 68*b* and is supplied to the inside of the motor shaft 21. Other part of the oil O accumulated in the catch tank 93 is supplied to the bearing in the gear chamber 82.

A centrifugal force accompanying the rotation of the rotor 20 is applied to the oil O supplied to the hollow portion 22 of the motor shaft 21. The oil O is continuously scattered outward in the tendency direction from a hole provided in the rotor 20 to cool the stator 30. The oil O that has reached the stator 30 drops downward while taking heat from the stator 30, and accumulates in the lower region in the motor chamber 81. The oil O accumulated in the lower region in the motor chamber 81 moves to the gear chamber 82 via the third opening portion 64*g* provided in the second wall portion 64.

The pump 96, the cooler 97, and the supply pipe 95 are provided in the path of the second oil passage 92. The pump 96 pumps the oil O in the second oil passage 92. The cooler 97 cools the oil O passing through the second oil passage 92.

The supply pipe 95 is disposed in an upper region of the motor chamber 81. The supply pipe 95 is disposed directly above the motor 2. That is, the supply pipe 95 is disposed on the upper side of the motor 2 in the inside of the housing 6.

The supply pipe 95 extends along the axial direction. The supply pipe 95 is connected to the first wall portion 62 and the second wall portion 64. The supply pipe 95 is disposed on the upper side of the motor 2 in the inside of the motor chamber 81. The supply pipe 95 is provided with a discharge hole 95*a* opened to the motor 2 side. That is, the supply pipe 95 is provided with the discharge hole 95*a* for discharging the oil O.

In the present embodiment, the case where the pipe-shaped supply pipe 95 through which the oil O flows is provided as the oil supply portion has been described. However, the oil supply portion may have other forms. As an example, the oil supply portion may have a gutter shape that drops the oil from a discharge hole provided in the bottom portion while storing the oil O.

In the second oil passage 92, the oil O is sucked up by the pump 96 and cooled by the cooler 97 to reach the supply pipe 95. The oil O flowing through the supply pipe 95 is discharged from the discharge hole 95*a* provided in the supply pipe 95 toward the motor 2. The oil O discharged from the supply pipe 95 is supplied to the motor 2 from the upper side of the motor 2. Part of the oil O discharged from the supply pipe 95 is supplied to the bearings 16 and 16A. Here, a passage through which the oil discharged from the discharge hole 95*a* of the supply pipe 95 reaches the bearing 16 is referred to as a guide channel 94, a first channel 98, and a second channel 99 in order from the upstream side. That is, the oil passage 90 includes the guide channel 94, the first channel 98, and the second channel 99.

The oil O fed to the motor 2 absorbs heat from the stator 30 while traveling on and along an outer peripheral face of the stator 30, and thus cools the motor 2. The oil O flowing along the outer peripheral face of the stator 30 drops down and accumulates in the lower region in the motor chamber 81. The oil O in the second oil passage 92 joins the oil O in the first oil passage 91 in the lower region in the motor chamber 81. The oil O accumulated in the lower region in the motor chamber 81 moves to the lower region (that is, the oil pool P) in the gear chamber 82 via the third opening portion 64*g*.

Here, the guide channel 94 will be described with reference to FIG. 2. The first channel 98 and the second channel 99 will be described in detail later together with the holding structure of the bearing 16.

A plurality of ribs 62*d* are provided on a face 62*c* of the first wall portion 62 facing the motor chamber 81. The plurality of ribs 62*d* protrude to the other side (−Y side) in the axial direction. The plurality of ribs 62*d* extend radially outward from the bearing holding portion 65. The plurality of ribs 62*d* are arranged side by side along the circumferential direction. The circumferential distance between the ribs 62*d* arranged in the circumferential direction decreases from radially outside toward radially inside.

The guide channel 94 is provided between the ribs 62*d* adjacent in the circumferential direction. The ribs 62*d* disposed on one circumferential direction side and the other circumferential direction side of the guide channel 94 are referred to as a first rib 62*da* and a second rib 62*db*, respectively. The first rib 62*da* and the second rib 62*db* are located above the bearing holding portion 65. That is, the first rib 62*da* and the second rib 62*db* extend upward from the bearing holding portion 65. The second rib 62*db* extends parallel to the vertical direction. The first rib 62*da* extends slightly inclined with respect to the vertical direction. More specifically, the first rib 62*da* is inclined in a direction away from the second rib 62*db* toward the upper side. An inlet of the first channel 98 is provided between a connection portion between the first rib 62*da* and the bearing holding portion 65 and a connection portion between second rib 62*db* and bearing holding portion 65.

The oil O discharged from the supply pipe 95 is applied to the side surface of the first rib 62*da*. The side surface of the first rib 62*da* to which the oil O is applied is a surface facing the second rib 62*db* side. The oil O that has reached the first rib 62*da* flows downward along the side surface of the first rib 62*da* and reaches the first channel 98 provided in the bearing holding portion 65. As described above, the guide channel 94 is configured by the side surface of the rib 62*d* of the first wall portion 62, and is a channel for guiding the oil O discharged from the supply pipe 95 to the inlet of the first channel 98. As will be described later, the first channel 98 is disposed in the inside of a penetrating portion 66*a* of the bearing holding portion 65. According to the present embodiment, the guide channel 94 guides the oil O dropped from the discharge hole 95*a* to the penetrating portion 66*a* located below the discharge hole 95*a* of the supply pipe 95. According to the present embodiment, the oil O discharged from the discharge hole 95*a* can be smoothly guided to the first channel 98.

Next, configurations of the bearing holding portion 65 and the insulating member 70 will be described. As described above, the bearing holding portion 65 holds the bearing 16.

Here, the bearing holding portion 65 of the first wall portion 62 and the insulating member 70 held by the bearing holding portion 65 will be specifically described. However, it is preferable that the bearing holding portion 65A and the insulating member 70A of the second wall portion 64 have the same configuration.

Figure 3:
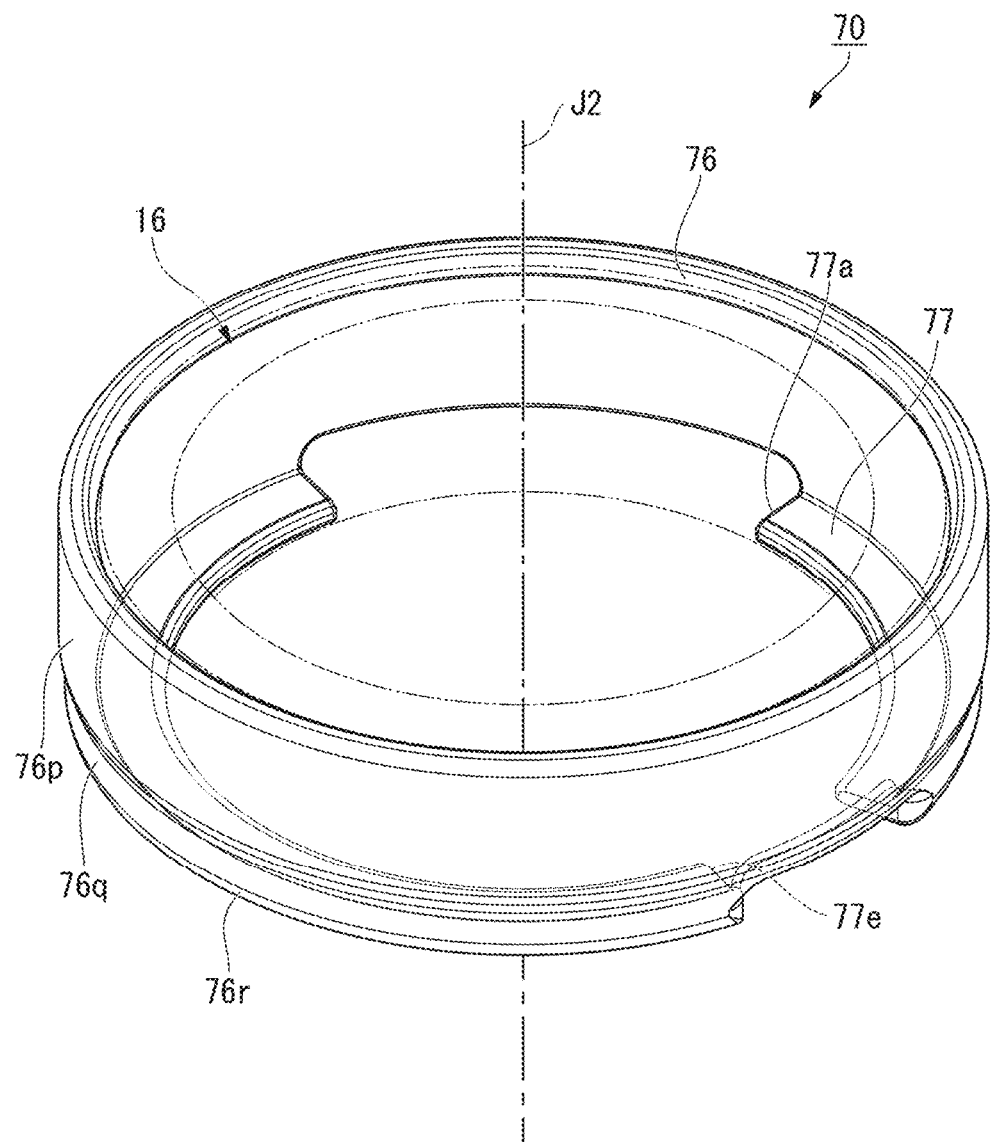
FIG. 3 is a perspective view of an insulating member according to an embodiment.
Figure 4:
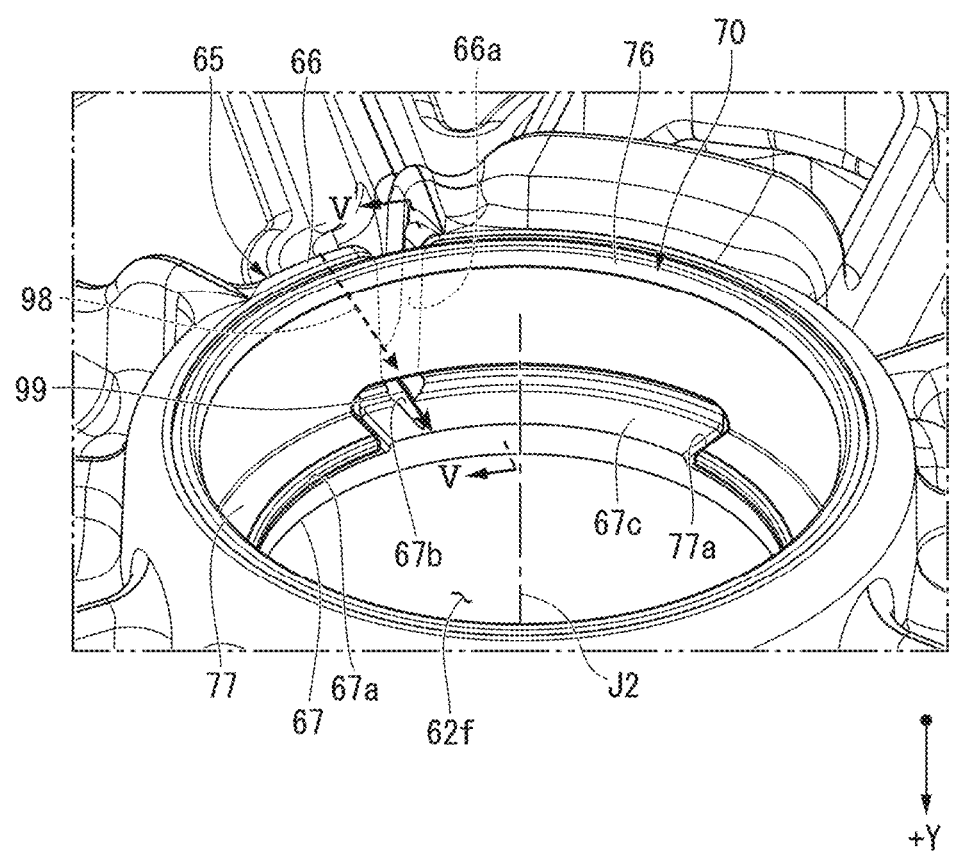
FIG. 4 is a perspective view of an insulating member and a bearing holding portion according to an embodiment.
Figure 5:
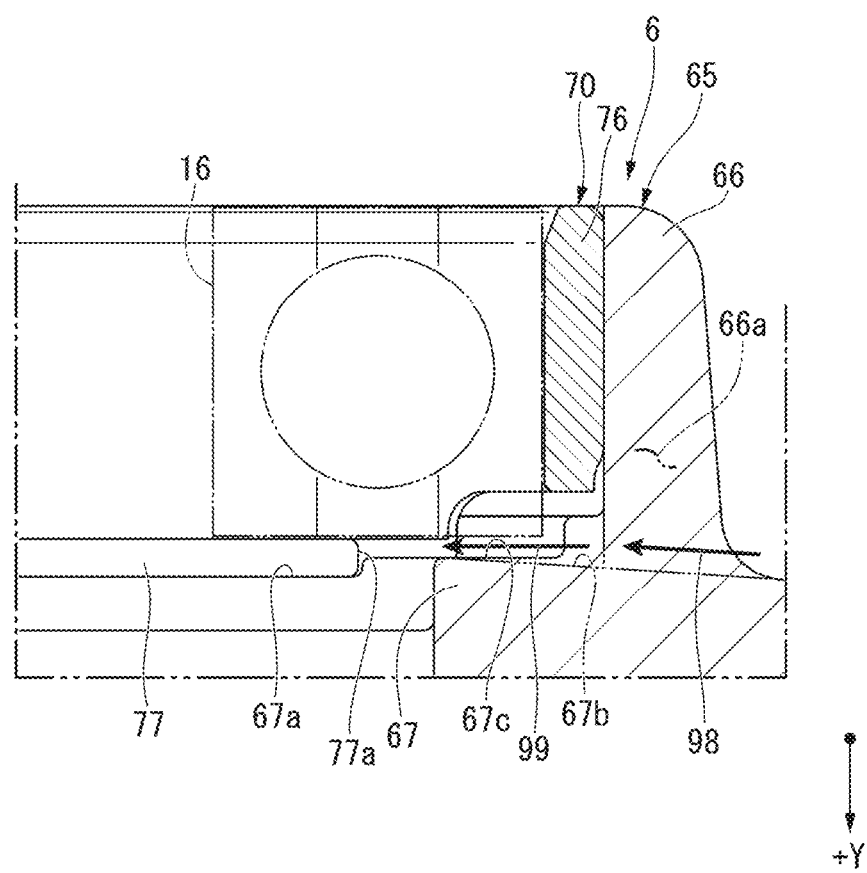
FIG. 5 is a cross-sectional view of the insulating member and the bearing holding portion taken along line V-V in FIG. 4.
Figure 6:
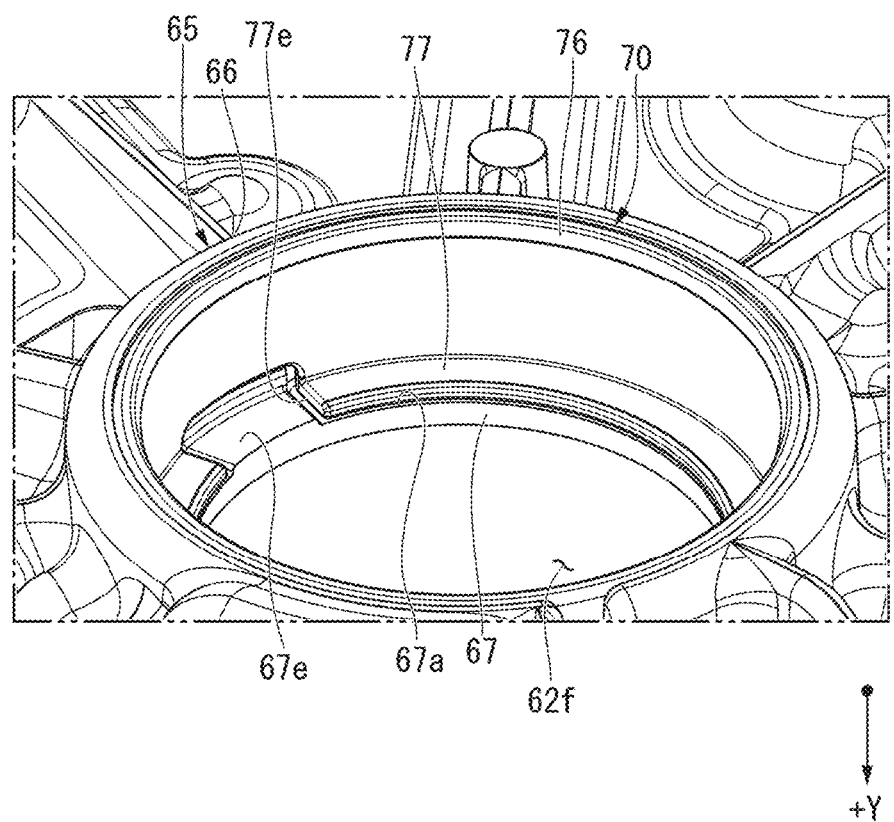
FIG. 6 is a perspective view of the insulating member and the bearing holding portion according to an embodiment as viewed from a direction different from that in FIG. 4.

FIG. 3 is a perspective view of the insulating member 70. FIG. 4 is a perspective view of the bearing holding portion 65 to which the insulating member 70 is attached. FIG. 5 is a cross-sectional view of the insulating member 70 and the bearing holding portion 65 taken along line V-V in FIG. 4. FIG. 6 is a perspective view of the bearing holding portion 65 to which the insulating member 70 is mounted, as viewed from a direction different from that in FIG. 4.

As illustrated in FIG. 4, the bearing holding portion 65 includes a holding tubular portion 66 and a holding bottom portion 67.

The holding tubular portion 66 protrudes from the edge portion of the first shaft passing hole 62*f* to the other side (−Y side) in the axial direction. The holding tubular portion 66 has a cylindrical shape centered on the motor axis J2. The holding tubular portion 66 holds the bearing 16 from radially outside.

The holding tubular portion 66 is provided with the penetrating portion 66*a* penetrating radially inside and outside. The penetrating portion 66*a* of the present embodiment has a cutout shape opened at an end portion on the other side (−Y side) in the axial direction of the holding tubular portion 66. In the present embodiment, the penetrating portion 66*a* penetrates in the vertical direction. On the upper side of the penetrating portion 66*a*, the supply pipe 95 for discharging the oil O downward is disposed. The oil O is supplied from the supply pipe 95 to the penetrating portion 66*a*. Thus, the penetrating portion 66*a* functions as the first channel 98 that guides the oil O from radially outside to radially inside of the holding tubular portion 66. In other words, the first channel 98 is disposed in the inside of the penetrating portion 66*a*.

The holding bottom portion 67 extends radially inward from an end portion on one side (+Y side) in the axial direction of the holding tubular portion 66. The inner edge of the holding bottom portion 67 has a circular shape centered on the motor axis J2 as viewed from the axial direction. The holding bottom portion 67 extends annularly along the circumferential direction of the motor axis J2. The holding bottom portion 67 supports the bearing 16 from one side (+Y side) in the axial direction.

As illustrated in FIGS. 4 and 6, the holding bottom portion 67 includes a holding bottom surface 67*a*, a first step portion (step portion) 67 *c*, a second step portion (step portion) 67*e*, and a groove portion 67*b*. The holding bottom surface 67*a* is a surface facing the other side (−Y side) in the axial direction of the holding bottom portion 67. The first step portion 67*c* and the second step portion 67*e* protrude from the holding bottom surface 67*a* toward the other side (−Y side) in the axial direction. The first step portion 67*c* and the second step portion 67*e* have the same protrusion height.

As illustrated in FIG. 2, the first step portion 67*c* and the second step portion 67*e* are disposed at different positions in the circumferential direction. Each of the first step portion 67*c* and the second step portion 67*e* is provided over the entire radial width of the holding bottom portion 67. The first step portion 67*c* and the second step portion 67*e* each extend along the circumferential direction. In the present embodiment, a dimension d1 along the circumferential direction of the first step portion 67*c* is larger than a dimension d2 along the circumferential direction of the second step portion 67*e*. The first step portion 67*c* is disposed radially inside the first opening portion 62*a*. On the other hand, the second step portion 67*e* is disposed radially inside the second opening portion 62*b*.

As illustrated in FIG. 4, the groove portion 67*b* is provided in the first step portion 67*c*. The groove portion 67*b* is disposed radially inside the penetrating portion 66*a*. The groove portion 67*b* extends along the radial direction. The end portion on the radially outer side of the groove portion 67*b* is connected to the penetrating portion 66*a*. The oil O that has passed through the inside of the penetrating portion 66*a* flows through the groove portion 67*b*. Therefore, the groove portion 67*b* functions as the second channel 99 connected to the first channel 98 in the penetrating portion 66*a*. In other words, the second channel 99 is disposed in the inside of the groove portion 67*b*.

As illustrated in FIG. 3, the insulating member 70 of the present embodiment has a cup shape including an insulating tubular portion 76 and an insulating bottom portion 77. The insulating member 70 is made of an insulating member. The insulating member 70 of the present embodiment is made of an aluminum alloy whose surface has been subjected to alumite treatment. By performing the alumite treatment, an insulating film made of aluminum oxide is provided on the surface of the aluminum alloy. Therefore, the aluminum alloy subjected to the alumite treatment has an insulating property as a whole, and can be adopted as the insulating member 70.

As illustrated in FIG. 4, the insulating tubular portion 76 has a cylindrical shape centered on the motor axis J2. The insulating tubular portion 76 extends in the axial direction along the holding tubular portion 66 of the bearing holding portion 65. The insulating tubular portion 76 is disposed between the inner peripheral face of the holding tubular portion 66 and the outer peripheral face of the outer ring of the bearing 16. As a result, the insulating tubular portion 76 suppresses direct contact between the holding tubular portion 66 and the bearing 16, and suppresses a current from flowing through the bearing 16.

The insulating bottom portion 77 is located at an end portion on one side (+Y side) in the axial direction of the insulating tubular portion 76. The inner edge of the insulating bottom portion 77 has a circular shape centered on the motor axis J2 as viewed from the axial direction. The insulating bottom portion 77 extends annularly along the radial direction of the motor axis J2. The insulating bottom portion 77 extends in the radial direction along the holding bottom portion 67. The insulating bottom portion 77 is disposed between the holding bottom portion 67 and the bearing 16. The insulating bottom portion 77 suppresses direct contact between the insulating bottom portion 77 and the bearing 16, and suppresses a current from flowing through the bearing 16.

A large diameter portion 76p and a small diameter portion 76q are provided on the outer peripheral face of the insulating tubular portion 76. The large diameter portion 76p and the small diameter portion 76q are arranged side by side along the axial direction. The large diameter portion 76p is provided in a region opposite to the insulating bottom portion 77 on the outer peripheral face of the insulating tubular portion 76. The small diameter portion 76q is provided in a region on the insulating bottom portion 77 side on the outer peripheral face of the insulating tubular portion 76. The diameter of the small diameter portion 76q is smaller than the diameter of the large diameter portion 76p. The diameter of the large diameter portion 76p substantially coincides with the inner diameter of the holding tubular portion 66. On the other hand, the diameter of the small diameter portion 76q is smaller than the inner diameter of the holding tubular portion 66.

In the step of attaching the insulating member 70 to the bearing holding portion 65, a region of the insulating tubular portion 76 on the insulating bottom portion 77 side easily comes into contact with an edge portion of the holding tubular portion 66 or the like. The insulating film may be damaged by contact with an edge portion of another member.

According to the present embodiment, the small diameter portion 76q is provided in a region that is likely to come into contact with other members on the outer peripheral face of the insulating tubular portion 76. Since the small diameter portion 76q is smaller than the inner diameter of the holding tubular portion 66, a gap is generated between the small diameter portion 76q and the inner peripheral face of the holding tubular portion 66 in a state where the insulating member 70 is attached to the bearing holding portion 65. According to the present embodiment, even if the insulating film of the small diameter portion 76q is damaged, it is possible to suppress the electrical connection between the insulating member 70 and the bearing holding portion 65.

In the present embodiment, a corner portion 76r connecting the outer peripheral face of the insulating tubular portion 76 and the insulating bottom portion has a smooth curved shape. That is, the corner portion 76r is provided with an R shape. According to the present embodiment, as compared with the case where the corner portion 76r has a sharp shape, the film of the insulating member 70 (the alumite film in the present embodiment) is easily formed without unevenness even at the corner portion 76r. When the insulating member 70 is press-fitted into the bearing holding portion 65, local stress is less likely to be applied to a part of the corner portion 76r, and damage to the insulating film of the corner portion 76r can be suppressed.

As illustrated in FIG. 2, the insulating bottom portion 77 is provided with a first slit (slit) 77a and a second slit (slit) 77e. The first slit 77a and the second slit 77e extend in the radial direction. Each of the first slit 77a and the second slit 77e reaches the entire radial width of the insulating bottom portion 77. The first slit 77a and the second slit 77e extend along the circumferential direction. In the present embodiment, the dimension along the circumferential direction of the first slit 77a is larger than the dimension along the circumferential direction of the second slit 77e.

As illustrated in FIG. 4, the first step portion 67c is inserted into the first slit 77a. That is, the first step portion 67c is inserted into the first slit 77a. The dimension along the circumferential direction of the first slit 77a is the same as or slightly larger than the dimension along the circumferential direction of the first step portion 67c. Therefore, the first step portion 67c functions as a rotation stopper of the insulating member 70.

As illustrated in FIG. 6, the second step portion 67e is inserted into the second slit 77e. That is, the second step portion 67e is inserted into the second slit 77e. The dimension along the circumferential direction of the second slit 77e is the same as or slightly larger than the dimension along the circumferential direction of the second step portion 67e. The second step portion 67e functions as a rotation stopper of the insulating member 70 together with the first step portion 67c. In the present embodiment, the case where the holding bottom portion 67 is provided with the two step portions (the first step portion 67c and the second step portion 67e), and each of the step portions functions as a rotation stopper has been described. However, any one of the two step portions functions as a rotation stopper.

As illustrated in FIG. 5, the first channel 98 is disposed in the inside of the cutout penetrating portion 66a provided in the holding tubular portion 66. The second channel 99 is disposed in the inside of the groove portion 67b provided in the holding bottom portion 67 and the first slit 77a of the insulating bottom portion 77. The first channel 98 and the second channel 99 are connected and disposed. The oil O discharged from the discharge hole 95a (see FIG. 2) of the supply pipe 95 described above reaches the first channel 98. The oil O reaches the radially inner side of the holding tubular portion 66 through the first channel 98. Further, the oil O passes through the second channel 99, reaches the radially inner side of the insulating tubular portion 76, and is supplied to the bearing 16. In this manner, the second channel 99 connects the first channel 98 and the bearing 16.

According to the present embodiment, the oil O can be supplied to the bearing 16 disposed inside the insulating member 70 via the first channel 98 and the second channel 99 while securing insulation between the housing 6 and the bearing 16 using the insulating member 70. According to the present embodiment, therefore, it is possible to smoothly operate the bearing 16 by imparting lubricity to the bearing 16 while suppressing electrolytic corrosion of the bearing.

According to the present embodiment, the second channel 99 passes through the groove portion 67b provided in the first step portion 67c of the holding bottom portion 67. The first slit 77a of the insulating bottom portion 77 is fitted in the first step portion 67c. Therefore, the second channel 99 is disposed in the inside of the first slit 77a. As a result, the second channel 99 can smoothly guide the oil O to the bearing 16 inside the insulating bottom portion 77 via the first slit 77a.

According to the present embodiment, the second channel 99 is disposed in the inside of the groove portion 67b extending along the radial direction. Therefore, the oil O can be prevented from spreading and flowing out, the oil O can be intensively guided to the bearing 16, and the lubricity of the bearing 16 can be more reliably enhanced.

As illustrated in FIG. 2, the first wall portion 62 extends radially outward from the bearing holding portion 65. The first wall portion 62 is provided with the first opening portion 62a located radially outside the first step portion 67c and the second opening portion 62b located radially outside the second step portion 67e. If the first opening portion 62a and the second opening portion 62b are provided in the first wall portion 62, stress concentration may occur in the vicinity of the first opening portion 62a and the second opening portion 62b, and the strength and rigidity of the first wall portion 62 may be reduced. On the other hand, strength and rigidity of the bearing holding portion 65 are locally enhanced by increasing the thickness of the holding bottom portion 67 in the first step portion 67c and the second step portion 67e.

According to the present embodiment, the first wall portion 62 is reinforced by the first step portion 67c arranged on the radially inner side of the first opening portion 62a and the second step portion 67e arranged on the radially inner side of the second opening portion 62b. As a result, it is possible to prevent the strength and rigidity of the first wall portion 62 from locally decreasing in the vicinity of the first opening portion 62a and the second opening portion 62b.

In the present embodiment, the holding bottom portion 67 has two step portions 67c and 67e, and the first wall portion 62 is provided with two opening portions 62a and 62b. More specifically, the holding bottom portion 67 has the first step portion 67c and the second step portion 67e as step portions. The first wall portion 62 is provided with the first opening portion 62a located radially outside the first step portion 67c and the second opening portion 62b located radially outside the second step portion 67e.

In the present embodiment, a dimension d1 along the circumferential direction of the first step portion 67c is larger than a dimension d2 along the circumferential direction of the second step portion 67e. Further, dimension d3 along the circumferential direction of the first opening portion 62a is larger than dimension d4 along the circumferential direction of the second opening portion 62b. That is, according to the present embodiment, the relatively large step portion (first step portion 67c) is disposed inside the relatively large opening portion (first opening portion 62a). A relatively small step (second step portion 67e) is disposed inside the relatively small opening (second opening portion 62b). As a result, the step portion can be effectively disposed inside the portion where the strength decreases, and the first wall portion 62 can be effectively disposed.

Hereinafter, configurations of an insulating member and a bearing holding portion according to a modification that can be employed in the above-described embodiment will be described. In the description of each modification, the same reference numerals are given to constituent elements of the same aspects as those of the embodiment already described or the modification already described, and the description thereof will be omitted.

Figure 7:
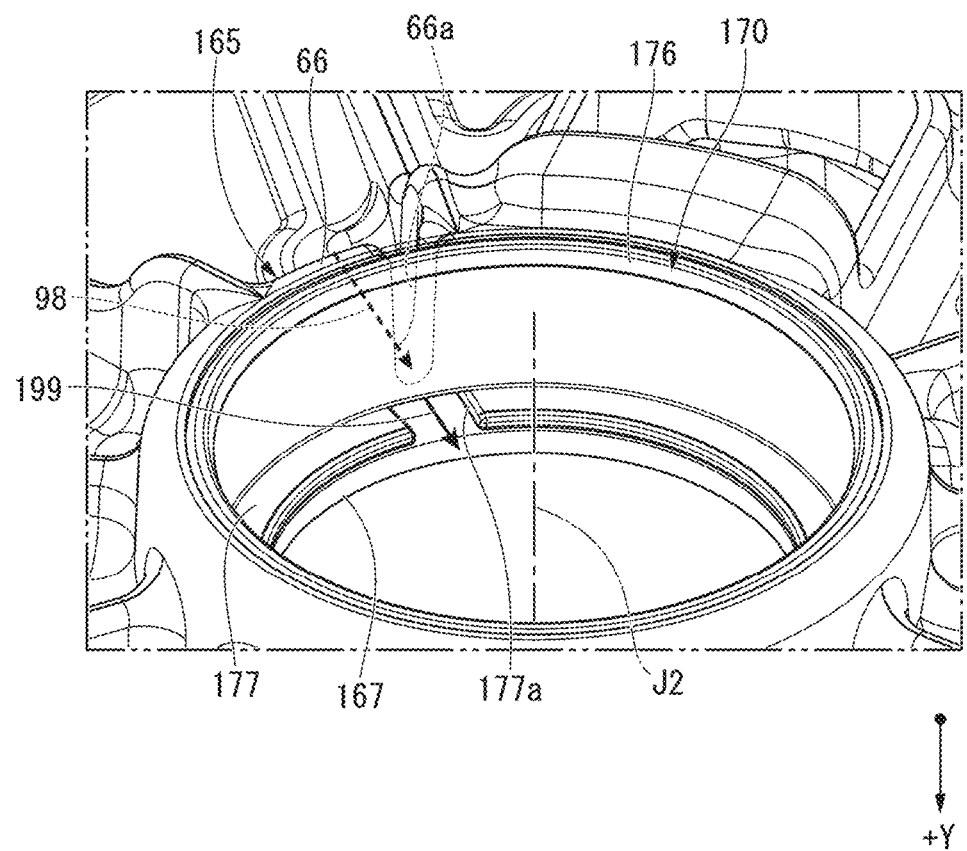
FIG. 7 is a perspective view of an insulating member and a bearing holding portion according to Modification 1.

FIG. 7 is a perspective view of an insulating member 170 and a bearing holding portion 165 of Modification 1.

As in the above-described embodiment, the bearing holding portion 165 includes a holding tubular portion 66 and a holding bottom portion 167. The holding tubular portion 66 of the present modification has the same configuration as that of the above-described embodiment. The holding tubular portion 66 is provided with the cutout penetrating portion 66a. Similarly to the above-described embodiment, the first channel 98 through which the oil O passes is disposed in the inside of the cutout penetrating portion 66a provided in the holding tubular portion 66. In addition, the holding bottom portion 167 of the present modification does not have a step portion as compared with the above-described embodiment, and has a uniform cross-sectional shape along the circumferential direction.

As in the above-described embodiment, the insulating member 170 has a cup shape including an insulating tubular portion 176 and an insulating bottom portion 177. The insulating tubular portion 176 has a cylindrical shape centered on the motor axis J2. The insulating tubular portion 176 extends in the axial direction along the holding tubular portion 66. The insulating bottom portion 177 is located at an end portion on one side (+Y side) in the axial direction of the insulating tubular portion 176. The insulating bottom portion 177 extends in the radial direction along the holding bottom portion 167.

The insulating bottom portion 177 is provided with a slit 177a. The slit 177a extends in the radial direction. The slit 177a reaches the entire radial width of the insulating bottom portion 177. The slit 177a is disposed radially inside the penetrating portion 66a of the holding tubular portion 66. A second channel 199 through which the oil O passes is disposed in the inside of the slit 177a.

The first channel 98 and the second channel 199 are connected and disposed. The oil O reaches the radially inner side of the holding tubular portion 66 through the first channel 98. Further, the oil O passes through the second channel 199, reaches the radially inner side of the insulating tubular portion 176, and is supplied to the bearing. In this manner, the second channel 199 connects the first channel 98 and the bearing. According to the present modification, the oil O can be effectively supplied to the bearing through the first channel 98 and the second channel 199.

Figure 8:
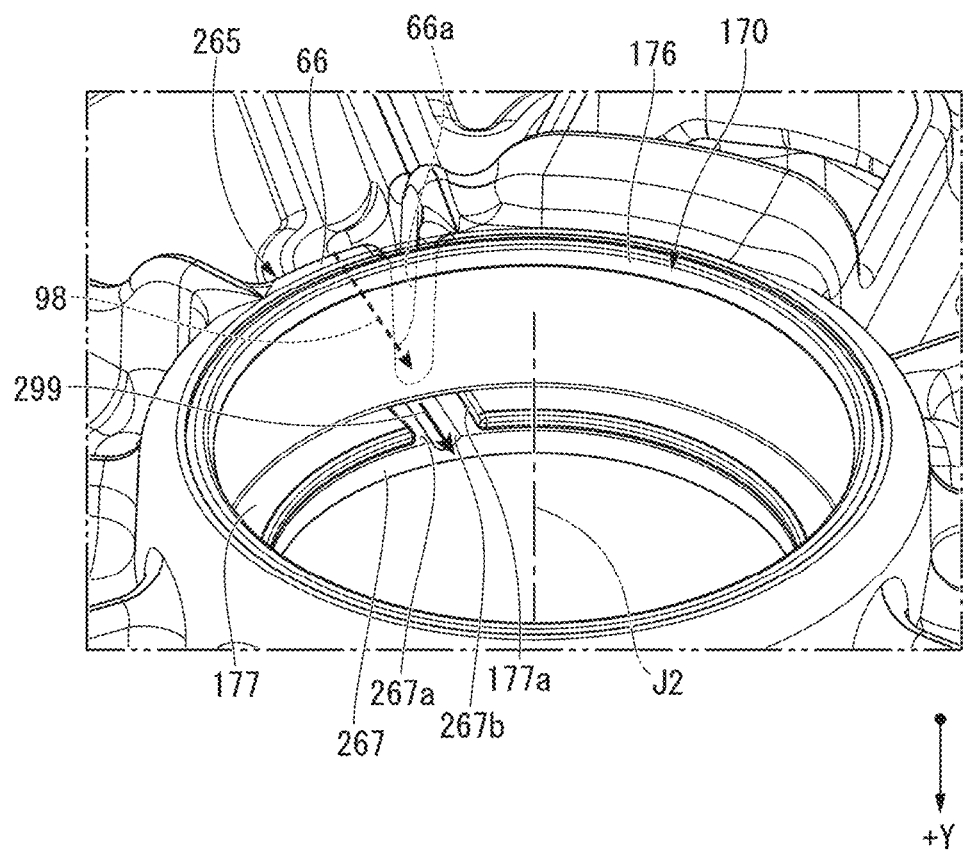
FIG. 8 is a perspective view of an insulating member and a bearing holding portion according to Modification 2.

FIG. 8 is a perspective view of a bearing holding portion 265 and an insulating member 170 attached to the bearing holding portion 265 according to Modification 2. In the present modification, the insulating member 170 has the same configuration as that of Modification 1, and thus description thereof is omitted.

As in the above-described embodiment, the bearing holding portion 265 includes the holding tubular portion 66 and a holding bottom portion 267. The holding tubular portion 66 of the present modification has the same configuration as that of the above-described embodiment. The holding tubular portion 66 is provided with the cutout penetrating portion 66a.

The holding bottom portion 267 of the present modification does not have a step portion as compared with the above-described embodiment. The holding bottom portion 267 has a holding bottom surface 267a and a groove portion 267b. The holding bottom surface 267a is a surface facing the other side (−Y side) in the axial direction of the holding bottom portion 267. The groove portion 267b is provided on the holding bottom surface 267a. The groove portion 267b extends in the radial direction. The end portion on the radially outer side of the groove portion 267b is connected to the penetrating portion 66a. With the insulating member 170 attached to the bearing holding portion 265, the groove portion 267b overlaps the slit 177a as viewed from the axial direction.

In the present modification, a second channel 299 through which the oil O passes is disposed in the inside of the slit 177a and the groove portion 267b. The first channel 98 and the second channel 299 are connected and disposed. The oil O reaches the radially inner side of the holding tubular portion 66 through the first channel 98. Further, the oil O passes through the second channel 299, reaches the radially inner side of the insulating tubular portion 176, and is supplied to the bearing. In this manner, the second channel 299 connects the first channel 98 and the bearing. According to the present modification, the oil O can be effectively supplied to the bearing through the first channel 98 and the second channel 299.

Figure 9:
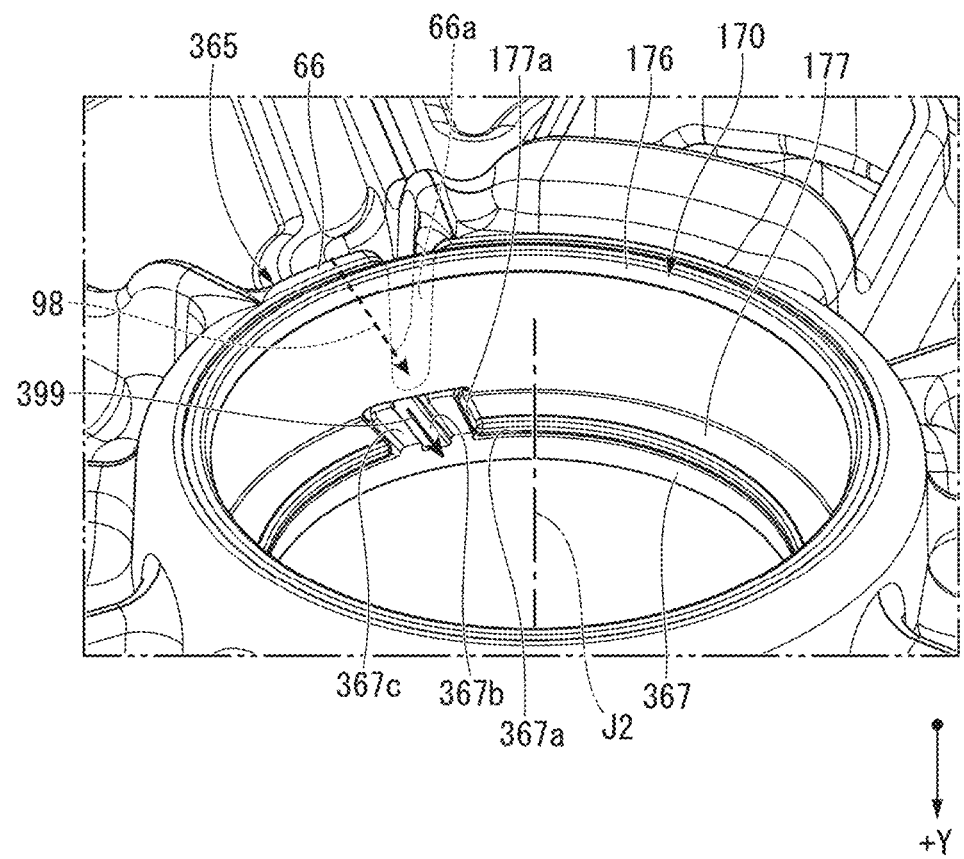
FIG. 9 is a perspective view of an insulating member and a bearing holding portion according to Modification 3.

FIG. 9 is a perspective view of a bearing holding portion 365 and an insulating member 170 attached to the bearing holding portion 365 according to Modification 3. In the present modification, the insulating member 170 has the same configuration as that of Modification 1, and thus description thereof is omitted.

As in the above-described embodiment, the bearing holding portion 365 includes the holding tubular portion 66 and a holding bottom portion 367. The holding tubular portion 66 of the present modification has the same configuration as that of the above-described embodiment. The holding tubular portion 66 is provided with the cutout penetrating portion 66a.

The holding bottom portion 367 of the present modification includes a holding bottom surface 367a, a step portion 367c, and a groove portion 367b. The holding bottom surface 367a is a surface facing the other side (−Y side) in the axial direction of the holding bottom portion 367. The step portion 367c protrudes from the holding bottom surface 367a to the other side (−Y side) in the axial direction. The step portion 367c is provided over the entire radial width of the holding bottom surface 367a. The step portion 367c is inserted into the slit 177a of the insulating member 170. As a result, the step portion 367c functions as a rotation stopper of the insulating member 170.

The groove portion 367b is provided in the step portion 367c. The groove portion 367b is disposed radially inside the penetrating portion 66a. The groove portion 367b extends along the radial direction. The end portion on the radially outer side of the groove portion 367b is connected to the penetrating portion 66a. A second channel 399 is disposed in the inside of the groove portion 367b.

In the present modification, the second channel 399 through which the oil O passes is disposed in the inside of the slit 177a and the groove portion 367b. The first channel 98 and the second channel 399 are connected and disposed. The oil O reaches the radially inner side of the holding tubular portion 66 through the first channel 98. Further, the oil O passes through the second channel 399, reaches the radially inner side of the insulating tubular portion 176, and is supplied to the bearing. In this manner, the second channel 399 connects the first channel 98 and the bearing. According to the present modification, the oil O can be effectively supplied to the bearing through the first channel 98 and the second channel 399.

Figure 10:
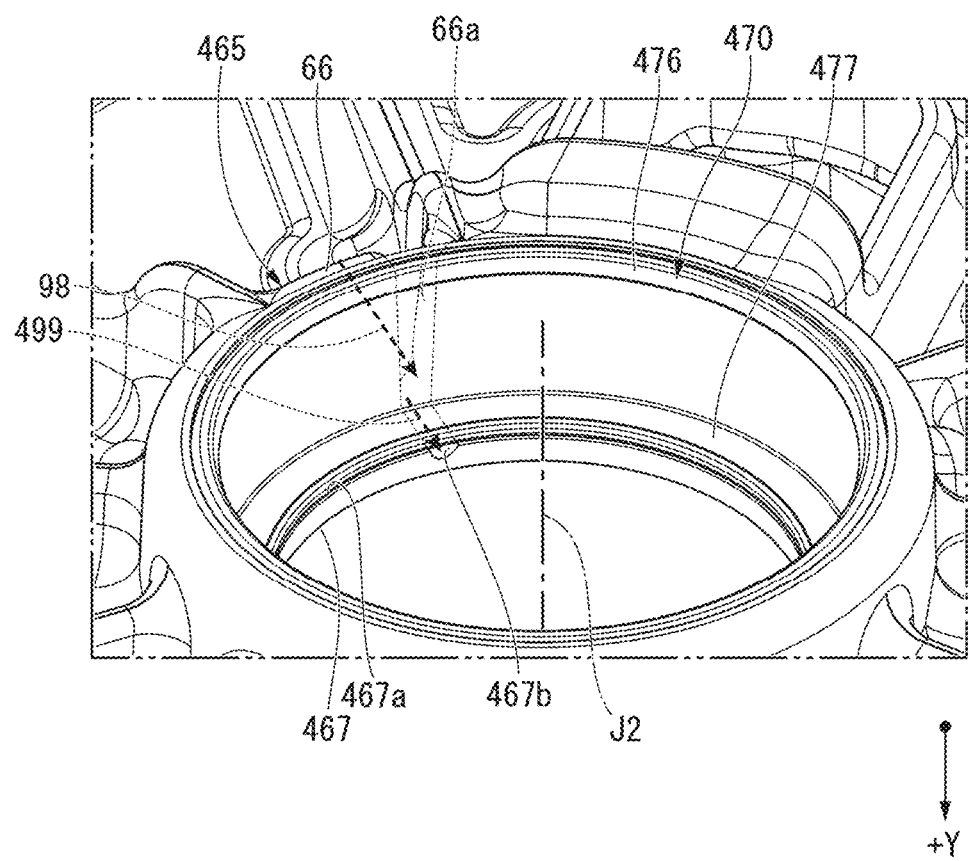
FIG. 10 is a perspective view of an insulating member and a bearing holding portion according to Modification 4.

FIG. 10 is a perspective view of an insulating member 470 and a bearing holding portion 465 according to Modification 4.

As in the above-described embodiment, the bearing holding portion 465 includes the holding tubular portion 66 and a holding bottom portion 467. The holding tubular portion 66 of the present modification has the same configuration as that of the above-described embodiment. The holding tubular portion 66 is provided with the cutout penetrating portion 66a. Similarly to the above-described embodiment, the first channel 98 through which the oil O passes is disposed in the inside of the cutout penetrating portion 66a provided in the holding tubular portion 66.

The holding bottom portion 467 of the present modification does not have a step portion as compared with the above-described embodiment. The holding bottom portion 467 has a holding bottom surface 467a and a groove portion 467b. The holding bottom surface 467a is a surface facing the other side (−Y side) in the axial direction of the holding bottom portion 467. The groove portion 467b is provided on the holding bottom surface 467a. The groove portion 467b extends in the radial direction. The end portion on the radially outer side of the groove portion 467b is connected to the penetrating portion 66a. A second channel 499 through which the oil O passes is disposed in the inside of the groove portion 467b.

As in the above-described embodiment, the insulating member 470 has a cup shape including an insulating tubular portion 476 and an insulating bottom portion 477. The insulating tubular portion 476 has a cylindrical shape centered on the motor axis J2. The insulating tubular portion 476 extends in the axial direction along the holding tubular portion 66. The insulating bottom portion 477 is located at an end portion on one side (+Y side) in the axial direction of the insulating tubular portion 476. The insulating bottom portion 477 extends in the radial direction along the holding bottom portion 467. The insulating tubular portion 476 and the insulating bottom portion 477 of the present modification are not provided with a slit and a penetrating portion. Therefore, the insulating tubular portion 476 and the insulating bottom portion 477 have a uniform cross-sectional shape along the circumferential direction. The insulating bottom portion 477 of the present modification covers the groove portion 467b of the holding bottom portion 467 from the other side (−Y side) in the axial direction. Therefore, it is possible to suppress the oil O passing through the groove portion 467b from leaking from the groove portion 467b.

According to the present modification, the first channel 98 and the second channel 499 are connected and arranged. The oil O reaches the radially inner side of the holding tubular portion 66 through the first channel 98. Further, the oil O passes through the second channel 499, reaches the radially inner side of the insulating tubular portion 476, and is supplied to the bearing. In this manner, the second channel 499 connects the first channel 98 and the bearing. According to the present modification, the oil O can be effectively supplied to the bearing through the first channel 98 and the second channel 499.

Figure 11:
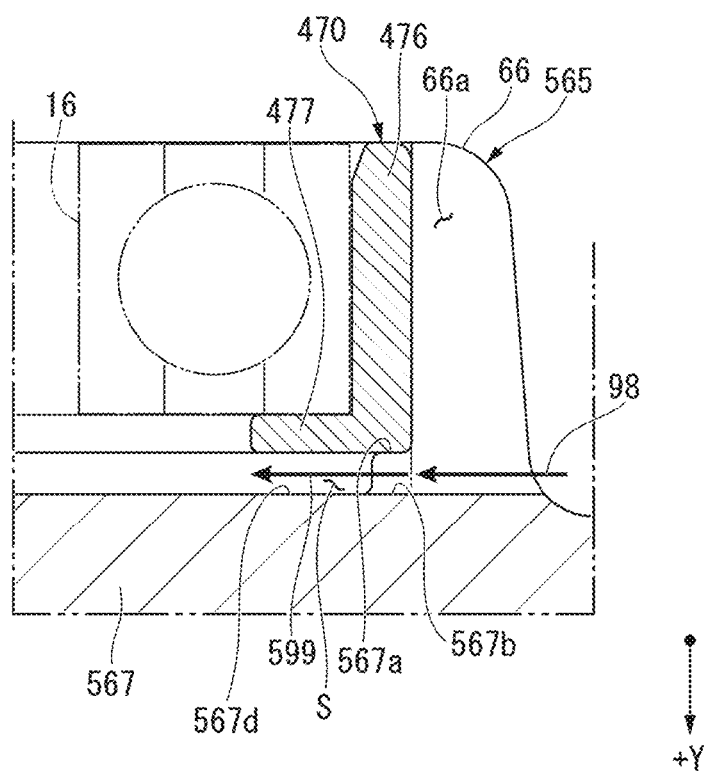
FIG. 11 is a cross-sectional view of an insulating member and a bearing holding portion according to Modification 5.

FIG. 11 is a cross-sectional view of a bearing holding portion 565 and the insulating member 470 attached to the bearing holding portion 565 of Modification 5. In the present modification, since the insulating member 470 has the same configuration as that of Modification 4, the description thereof will be omitted.

As in the above-described embodiment, the bearing holding portion 565 includes the holding tubular portion 66 and a holding bottom portion 567. The holding tubular portion 66 of the present modification has the same configuration as that of the above-described embodiment. The holding tubular portion 66 is provided with the cutout penetrating portion 66a. Similarly to the above-described embodiment, the first channel 98 through which the oil O passes is disposed in the inside of the cutout penetrating portion 66a provided in the holding tubular portion 66.

The holding bottom portion 567 of the present modification includes a holding bottom surface 567a, a facing bottom surface 567d, and a groove portion 567b. The holding bottom surface 567a and the facing bottom surface 567d face the other side (+Y side) in the axial direction. The holding bottom surface 567a and the facing bottom surface 567d each extend along the circumferential direction with a uniform radial width. The facing bottom surface 567d is located radially inside and on one side (+Y side) in the axial direction with respect to the holding bottom surface 567a. Therefore, the holding bottom surface 567a and the facing bottom surface 567d are arranged in a stepwise manner located on one side (+Y side) in the axial direction toward the radial inside. The holding bottom surface 567a is in contact with the insulating member 470. The holding bottom surface 567a supports the insulating bottom portion 477 of the insulating member 470 from one side in the axial direction. On the other hand, the facing bottom surface 567d is not in contact with the insulating bottom portion 477. The facing bottom surface 567d is disposed to face the insulating bottom portion 477 in the axial direction with the gap S interposed therebetween.

The groove portion 567b is provided on the holding bottom surface 567a. The groove portion 567b extends along the radial direction. The bottom surface of the groove portion 567b is continuous with the facing bottom surface 567d. The end portion on the radially outer side of the groove portion 567b is connected to the penetrating portion 66a. The radially inner end portion of the groove portion 567b is connected to the gap S between the facing bottom surface 567d and the insulating bottom portion 477.

According to the present modification, a second channel 599 through which the oil O passes is disposed between the groove portion 567b and the insulating bottom portion 477 and between the facing bottom surface 567d and the insulating bottom portion 477 (that is, the gap S). The first channel 98 and the second channel 599 are connected and disposed. The oil O reaches the groove portion 567b through the first channel 98. Further, the oil O is supplied to the bearing 16 through the second channel 599 in the groove portion 567b and in the gap S. In this manner, the second channel 599 connects the first channel 98 and the bearing 16. According to the present modification, the oil O can be effectively supplied to the bearing 16 through the first channel 98 and the second channel 599.

Figure 12:
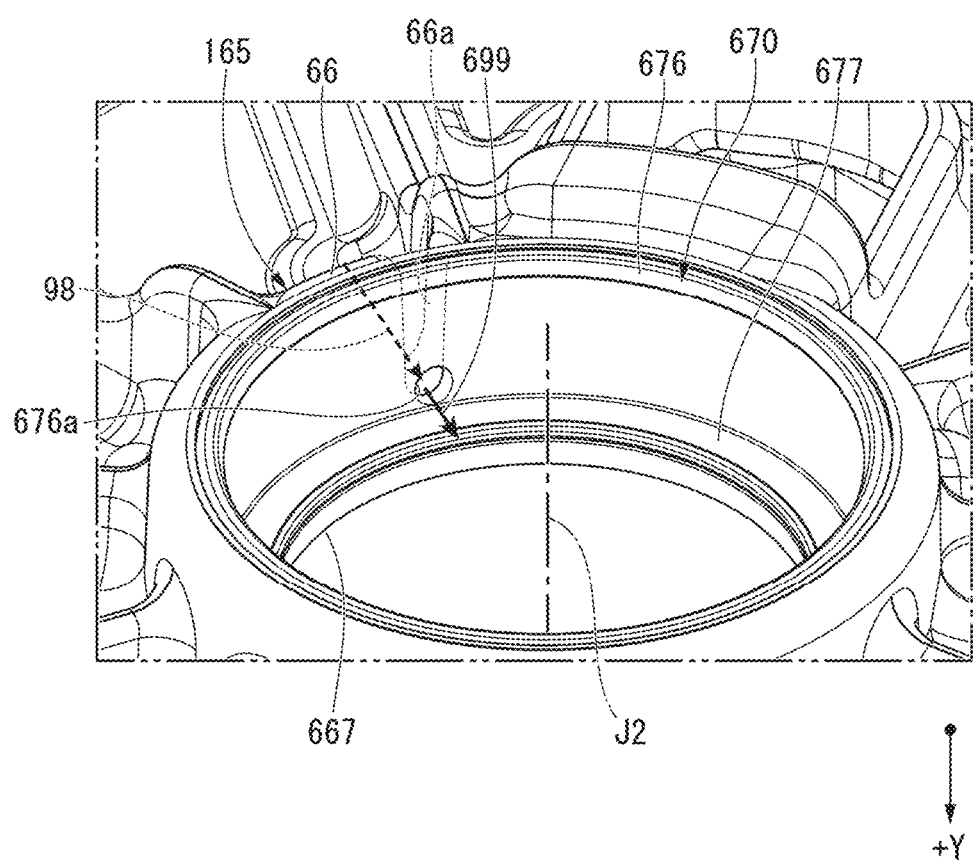
FIG. 12 is a perspective view of an insulating member and a bearing holding portion according to Modification 6.

FIG. 12 is a perspective view of an insulating member 670 of Modification 6 and the bearing holding portion 165 to which the insulating member 670 is mounted. The bearing holding portion 165 of the present modification has the same configuration as that of Modification 1. That is, the bearing holding portion 165 includes the holding tubular portion 66 provided with the penetrating portion 66a and a holding bottom portion 667 having a uniform cross-sectional shape along the circumferential direction. The first channel 98 through which the oil O passes is disposed in the inside of the penetrating portion 66a.

As in the above-described embodiment, the insulating member 670 has a cup shape including an insulating tubular portion 676 and an insulating bottom portion 677. The insulating tubular portion 676 has a cylindrical shape centered on the motor axis J2. The insulating tubular portion 676 extends in the axial direction along the holding tubular portion 66. The insulating bottom portion 677 is located at an end portion on one side (+Y side) in the axial direction of the insulating tubular portion 676. The insulating bottom portion 677 extends in the radial direction along the holding bottom portion 667.

The insulating tubular portion 676 is provided with an insulating penetrating portion 676a penetrating in the radial direction. The insulating penetrating portion 676a overlaps the penetrating portion 66a as viewed from the radial direction. Therefore, the oil O that has passed through the first channel 98 flows into the insulating penetrating portion 676a. That is, a second channel 699 is disposed in the inside of the insulating penetrating portion 676a.

The insulating penetrating portion 676a of the present modification is a circular hole as viewed from the radial direction. However, the insulating penetrating portion 676a is not limited to the configuration of the present modification as long as it penetrates the insulating tubular portion 676 in the radial direction, and may have, for example, a notch shape that opens at the end portion on the other side (−Y side) in the axial direction of the insulating tubular portion 676.

The first channel 98 and the second channel 699 are connected and disposed. The oil O reaches the radially inner side of the holding tubular portion 66 through the first channel 98. Further, the oil O passes through the second channel 699, reaches the radially inner side of the insulating tubular portion 676, and is supplied to the bearing. In this manner, the second channel 699 connects the first channel 98 and the bearing. According to the present modification, the oil O can be effectively supplied to the bearing through the first channel 98 and the second channel 699.

Figure 13:
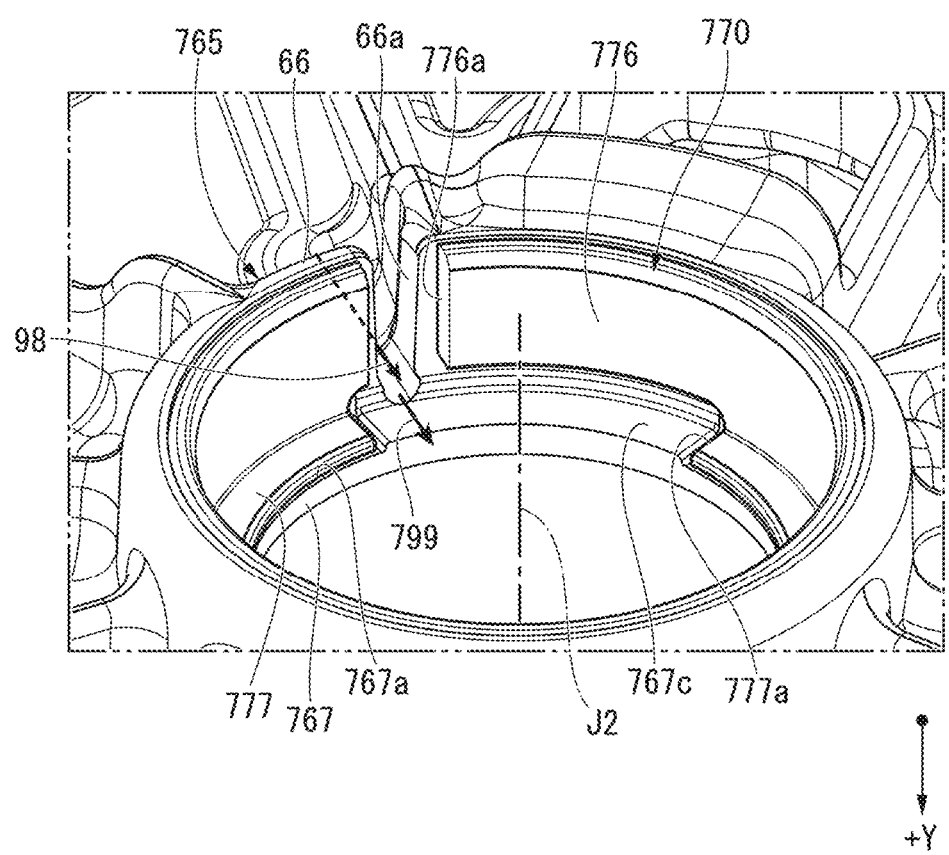
FIG. 13 is a perspective view of an insulating member and a bearing holding portion according to Modification 7.

FIG. 13 is a perspective view of an insulating member 770 and a bearing holding portion 765 of Modification 7.

As in the above-described embodiment, the bearing holding portion 765 includes a holding tubular portion 66 and a holding bottom portion 767. The holding tubular portion 66 of the present modification has the same configuration as that of the above-described embodiment. The holding tubular portion 66 is provided with the cutout penetrating portion 66a. Similarly to the above-described embodiment, the first channel 98 through which the oil O passes is disposed in the inside of the cutout penetrating portion 66a provided in the holding tubular portion 66.

The holding bottom portion 767 of the present modification includes a holding bottom surface 767a and a step portion 767c. The holding bottom surface 767a is a surface facing the other side (−Y side) in the axial direction of the holding bottom portion 767. The step portion 767c protrudes from the holding bottom surface 767a to the other side (−Y side) in the axial direction. The step portion 767c is provided over the entire radial width of the holding bottom surface 767a.

As in the above-described embodiment, the insulating member 770 includes an insulating tubular portion 776 and an insulating bottom portion 777. The insulating member 770 has a C shape provided with cut portions 776a and 777a continuous with the insulating tubular portion 776 and the insulating bottom portion 777. That is, the cut portion (hereinafter, the first cut portion 776a) of the insulating tubular portion 776 and the cut portion (second cut portion 777a) of the insulating bottom portion 777 are connected to each other.

The step portion 767c of the holding bottom portion 767 is fitted to the second cut portion 777a of the insulating bottom portion 777. Accordingly, rotation of the insulating member 770 with respect to the bearing holding portion 765 is suppressed. That is, the step portion 767c functions as a rotation stopper of the insulating member 770.

The first cut portion 776a of the insulating tubular portion 776 overlaps the penetrating portion 66a of the holding tubular portion 66 in the radial direction. Therefore, a second channel 799 through which the oil O passes is disposed in the inside of the first cut portion 776a.

The first channel 98 and the second channel 799 are connected and disposed. The oil O reaches the radially inner side of the holding tubular portion 66 through the first channel 98. Further, the oil O passes through the second channel 799 in the first cut portion 776a, reaches the radially inner side of the insulating tubular portion 776, and is supplied to the bearing. In this manner, the second channel 799 connects the first channel 98 and the bearing. According to the present modification, the oil O can be effectively supplied to the bearing through the first channel 98 and the second channel 799.

While an embodiment of the present invention and modifications thereof have been described above, it will be understood that features, a combination of the features, and so on according to the embodiment are only illustrative, and that an addition, elimination, and substitution of a feature(s), and other modifications can be made without departing from the scope and spirit of the present invention. Also note that the present invention is not limited by the embodiment.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A drive apparatus comprising:
a motor having a motor shaft that rotates about a motor axis;
a bearing that rotatably supports the motor shaft;
a housing that accommodates the motor therein and holds the bearing in a bearing holding portion;
an insulating member interposed between the bearing and the bearing holding portion; and
an oil passage through which the oil flows, wherein
the bearing holding portion includes:
a holding tubular portion that holds the bearing from radially outside; and
a holding bottom portion extending radially inward from an end portion on one side in an axial direction of the holding tubular portion,
the insulating member includes:
an insulating tubular portion extending in the axial direction along the holding tubular portion; and
an insulating bottom portion located at an end portion on one side in the axial direction of the holding bottom portion and extending in a radial direction along the holding bottom portion,
the holding tubular portion is provided with a penetrating portion penetrating radially inside and outside, and
the oil passage includes:
a first channel disposed in an inside of the penetrating portion; and
a second channel connecting the first channel and the bearing, wherein
the insulating bottom portion is provided with a slit extending in a radial direction, and the second channel is disposed in an inside of the slit.

2. The drive apparatus according to claim 1, wherein
the insulating bottom portion is provided with a slit extending in a radial direction,
the holding bottom portion includes:
a holding bottom surface facing a second side opposite the one side of holding tubular member in the axial direction; and
a groove portion provided on the holding bottom surface, overlapping the slit as viewed in the axial direction, and extending in a radial direction, and
the second channel is disposed in an inside of the slit and the groove portion.

3. The drive apparatus according to claim 1, wherein
the insulating bottom portion is provided with a slit extending in a radial direction,
the holding bottom portion includes:
a holding bottom surface facing a second side opposite the one side of holding tubular member in the axial direction;
a step portion that protrudes from the holding bottom surface in the axial direction and is inserted into the slit; and
a groove portion provided in the step portion and extending in a radial direction, and
the second channel is disposed in an inside of the groove.

4. The drive apparatus according to claim 1, wherein
the holding bottom portion includes:
a holding bottom surface facing a second side opposite the one side of holding tubular member in the axial direction; and
a groove portion provided on the holding bottom surface and extending in a radial direction, and
the second channel is disposed in an inside of the groove.

5. The drive apparatus according to claim 1, comprising
an oil supply portion disposed on an upper side of the motor in an inside of the housing and provided with a discharge hole for discharging the oil, wherein
the penetrating portion is located below the discharge hole, and
the oil passage includes a guide path that guides the oil dropped from the discharge hole to the penetrating portion.

6. The drive apparatus according to claim 1, comprising
a power transmission mechanism connected to the motor shaft, wherein
the power transmission mechanism includes a plurality of transmission shafts and a plurality of gears provided on an outer peripheral face of the transmission shaft.

7. The draft apparatus according to claim 6, wherein any one of the motor shaft and the plurality of transmission shafts is provided with an electrical discharging device that electrically connects the shaft and the housing.

8. A drive apparatus comprising:
a motor having a motor shaft that rotates about a motor axis;
a bearing that rotatably supports the motor shaft;
a housing that accommodates the motor therein and holds the bearing in a bearing holding portion;
an insulating member interposed between the bearing and the bearing holding portion; and
an oil passage through which the oil flows, wherein
the bearing holding portion includes:
a holding tubular portion that holds the bearing from radially outside; and
a holding bottom portion extending radially inward from an end portion on one side in an axial direction of the holding tubular portion,
the insulating member includes:
an insulating tubular portion extending in the axial direction along the holding tubular portion; and
an insulating bottom portion located at an end portion on one side in the axial direction of the holding bottom portion and extending in a radial direction along the holding bottom portion,
the holding tubular portion is provided with a penetrating portion penetrating radially inside and outside, and
the oil passage includes:
a first channel disposed in an inside of the penetrating portion; and a second channel connecting the first channel and the bearing, wherein
the holding bottom portion includes:
a holding bottom surface facing a second side opposite the one side of holding tubular member in the axial direction;
a facing bottom surface facing the second side in the axial direction and located radially inside and on one side in the axial direction with respect to the holding bottom surface; and
a groove portion provided on the holding bottom surface and extending in a radial direction,
the insulating member is in contact with the holding bottom surface, and
the second channel is disposed between the groove portion and the insulating bottom portion and between the facing bottom portion and the insulating bottom portion.

9. The drive apparatus according to claim 8, comprising a power transmission mechanism connected to the motor shaft, wherein
the power transmission mechanism includes a plurality of transmission shafts and a plurality of gears provided on an outer peripheral face of the transmission shaft.

10. A drive apparatus comprising:
a motor having a motor shaft that rotates about a motor axis;
a bearing that rotatably supports the motor shaft;
a housing that accommodates the motor therein and holds the bearing in a bearing holding portion;
an insulating member interposed between the bearing and the bearing holding portion; and
an oil passage through which the oil flows, wherein
the bearing holding portion includes:
a holding tubular portion that holds the bearing from radially outside; and
a holding bottom portion extending radially inward from an end portion on one side in an axial direction of the holding tubular portion,
the insulating member includes:
an insulating tubular portion extending in the axial direction along the holding tubular portion; and
an insulating bottom portion located at an end portion on one side in the axial direction of the holding bottom portion and extending in a radial direction along the holding bottom portion,
the holding tubular portion is provided with a penetrating portion penetrating radially inside and outside, and
the oil passage includes:
a first channel disposed in an inside of the penetrating portion; and
a second channel connecting the first channel and the bearing, wherein
the insulating tubular portion is provided with an insulating penetrating portion penetrating in a radial direction, and
the second channel is disposed in an inside of the insulating penetrating portion.

11. The drive apparatus according to claim 10, comprising a power transmission mechanism connected to the motor shaft, wherein
the power transmission mechanism includes a plurality of transmission shafts and a plurality of gears provided on an outer peripheral face of the transmission shaft.

12. A drive apparatus comprising:
a motor having a motor shaft that rotates about a motor axis;
a bearing that rotatably supports the motor shaft;
a housing that accommodates the motor therein and holds the bearing in a bearing holding portion;
an insulating member interposed between the bearing and the bearing holding portion; and
an oil passage through which the oil flows, wherein
the bearing holding portion includes:
a holding tubular portion that holds the bearing from radially outside; and
a holding bottom portion extending radially inward from an end portion on one side in an axial direction of the holding tubular portion,
the insulating member includes:
an insulating tubular portion extending in the axial direction along the holding tubular portion; and
an insulating bottom portion located at an end portion on one side in the axial direction of the holding bottom portion and extending in a radial direction along the holding bottom portion,
the holding tubular portion is provided with a penetrating portion penetrating radially inside and outside, and
the oil passage includes:
a first channel disposed in an inside of the penetrating portion; and
a second channel connecting the first channel and the bearing, wherein the insulating member has a C shape provided with a cut portion continuous with the insulating tubular portion and the insulating bottom portion.

13. The drive apparatus according to claim 12, wherein the second channel is disposed in an inside of the cut portion.

14. The drive apparatus according to claim 12, comprising a power transmission mechanism connected to the motor shaft, wherein
the power transmission mechanism includes a plurality of transmission shafts and a plurality of gears provided on an outer peripheral face of the transmission shaft.

15. A drive apparatus comprising:
a motor having a motor shaft that rotates about a motor axis;
a bearing that rotatably supports the motor shaft;
a housing that accommodates the motor therein and holds the bearing in a bearing holding portion;
an insulating member interposed between the bearing and the bearing holding portion; and
an oil passage through which the oil flows, wherein
the bearing holding portion includes:
a holding tubular portion that holds the bearing from radially outside; and
a holding bottom portion extending radially inward from an end portion on one side in an axial direction of the holding tubular portion,
the insulating member includes:
an insulating tubular portion extending in the axial direction along the holding tubular portion; and
an insulating bottom portion located at an end portion on one side in the axial direction of the holding bottom portion and extending in a radial direction along the holding bottom portion,
the holding tubular portion is provided with a penetrating portion penetrating radially inside and outside, and
the oil passage includes:
a first channel disposed in an inside of the penetrating portion; and
a second channel connecting the first channel and the bearing, wherein
the insulating bottom portion is provided with a slit extending in a radial direction, and the holding bottom portion includes:

a holding bottom surface facing a second side opposite the one side of holding tubular member in the axial direction; and a step portion that protrudes from the holding bottom surface side in the axial direction and is inserted into the slit.

16. The drive apparatus according to claim 15, wherein the housing has a wall portion extending radially outward from the bearing holding portion, and the wall portion is provided with an opening portion located radially outside the step portion.

17. The drive apparatus according to claim 16, wherein the holding bottom portion includes a first step portion and a second step portion as the step portion, the wall portion includes:

a first opening portion located radially outside the first step portion; and a second opening portion located radially outside the second step portion, a dimension along a circumferential direction of the first step portion is larger than a dimension along a circumferential direction of the second step portion, and a dimension along a circumferential direction of the first opening is larger than a dimension along a circumferential direction of the second opening.

18. The drive apparatus according to claim 15, comprising a power transmission mechanism connected to the motor shaft, wherein the power transmission mechanism includes a plurality of transmission shafts and a plurality of gears provided on an outer peripheral face of the transmission shaft.

* * * * *